(12) United States Patent
Iacobovici

(10) Patent No.: US 7,543,007 B2
(45) Date of Patent: Jun. 2, 2009

(54) RESIDUE-BASED ERROR DETECTION FOR A SHIFT OPERATION

(75) Inventor: Sorin Iacobovici, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 806 days.

(21) Appl. No.: 11/209,124

(22) Filed: Aug. 22, 2005

(65) Prior Publication Data

US 2007/0043796 A1    Feb. 22, 2007

(51) Int. Cl.
*G06F 7/00* (2006.01)
(52) U.S. Cl. ..................................... 708/209
(58) Field of Classification Search .................. 708/209
See application file for complete search history.

(56) References Cited

U.S. PATENT DOCUMENTS

| | | | | |
|---|---|---|---|---|
| 3,601,800 A | * | 8/1971 | Lee | 714/757 |
| 4,782,490 A | * | 11/1988 | Tenengolts | 714/756 |
| 7,376,890 B2 | * | 5/2008 | Busaba et al. | 714/808 |

OTHER PUBLICATIONS

U.S. Appl. No. 11/145,397, filed Jun. 3, 2005, and naming as inventor(s) Sorin Iacobovici.
U.S. Appl. No. 11/135,982, filed May 24, 2005, and naming as inventor(s) Sorin Iacobovici.

* cited by examiner

*Primary Examiner*—Tan V Mai
(74) *Attorney, Agent, or Firm*—Osha • Liang LLP

(57) ABSTRACT

Errors in a shift result can be detected with a residue-based mechanism, instead of with duplication of an entire shifter. The commutative property of residue computation over a bit string allows the residue of a value to be independent of the actual bit positions when the divisor is a Merrill number. Without a duplicated shifter, an operand that is the subject of a shift operation is formatted to become a multiple of k, where divisor=$2^k-1$, and the divisor is used for computation of residues. The shift operation is translated to a single position shift or a zero position shift. The translated shift is applied to the formatted operand to generate a shift check value. Despite different values, the residues of the shift result and the shift check value will be the same as long as bit groups are consistent between the two. An error(s) is detected by comparing the residue of the shift check value with the residue of the shift result.

19 Claims, 4 Drawing Sheets

US 7,543,007 B2

RESIDUE-BASED ERROR DETECTION FOR A SHIFT OPERATION

BACKGROUND

1. Field of the Invention

The invention relates to error detection and, in particular, residue-based error detection.

2. Description of the Related Art

High energy particles from cosmic radiation or alpha particles in packaging materials cause soft errors affecting electronic components. Such radiation events can cause charge collection at sensitive circuit nodes, corrupting those circuit states without causing permanent damage. The radiation events primarily affect storage elements (RAM cells, latches, flip-flops) which hold a state (bit values) for a relatively long time. Radiation events and altitude affect soft error rates of different storage elements. In addition, soft error rates (SER) depend on voltage and circuit characteristics.

Residue checking has been employed to detect errors (transient or permanent) for arithmetic operations, such as add, multiply and divide. Residue-based error detection typically relies upon a property of arithmetic operations that the residue of the arithmetic operation's result is equal to the residue of the result of the arithmetic operation as applied to the residues of the operands of the arithmetic operation. For example, if:

$c=a+b$, then $c \bmod N = ((a \bmod N) + (b \bmod N)) \bmod N$.

Unfortunately, this property does not apply to logical bit operations, such as AND, OR, or Shift. Voting and duplication are employed to detect errors for the units that perform logical bit operations. Although execution units that implement AND and OR operations are relatively simple and can be easily duplicated, shifters do not share these same characteristics. Shifters are relatively large units, and duplication of shifters for error detection incurs significant overhead. Accordingly, a technique is desired to protect shifters without shifter duplication.

SUMMARY

It has been discovered that residue-based error detection can be applied to protect shifters. The commutative property of residue computation of a bit string allows residue computation to be applied to shift results for error detection. Without duplicating a shifter, a residue-based error detection technique detects errors in shift results. The unshifted operand is formatted to form bit groups that are consistent with the bit groups of the shift result. The size of the bit groups are defined by the divisor employed for the residue computation. With the consistency of bit groups, the commutative property allows residue-based error detection without shifter duplication.

These and other aspects of the described invention will be better described with reference to the Detailed Description and accompanying Figures.

BRIEF DESCRIPTION OF THE DRAWINGS

The present invention may be better understood, and its numerous objects, features, and advantages made apparent to those skilled in the art by referencing the accompanying drawings.

In FIG. 3, a series of storage cells hold a 32-bit value.

The use of the same reference symbols in different drawings indicates similar or identical items.

DETAILED DESCRIPTION

The description that follows includes exemplary systems, methods, techniques, and instruction sequences that embody techniques of the present invention. However, it is understood that the described invention may be practiced without these specific details. For instance, the following description refers to mod-7 residue-based error detection mechanisms, but other parameters, such as smaller divisors (e.g., mod-3), may be utilized. In other instances, well-known protocols, structures and techniques have not been shown in detail in order not to obscure the invention. Furthermore, the following description presumes an architecture that orders values according to Little-endian endianness. Of course, those of ordinary skill in the art will appreciate that the described techniques and mechanisms can also be applied in an architecture that orders values otherwise.

Residues

The mod-D residue of a number N, N mod D, is the positive remainder resulting from the integer division of a signed integer N by an unsigned integer D (divisor). The residue of a number can be used for detecting errors in up to k bits of that number if D is a Merrill number ($D=2^k-1$). The commutative property of computing a residue over an operand, comprised of k-bit groups, allows error detection in shift results. The reason that mod-($2^k-1$) residues can be used to detect a number's bit errors is that the residue calculation uses all of the number's data bits in k-bit groups.

The residues usually employed are modulo-($2^k-1$), where k represents the number of residue bits. The ($2^k-1$) number, also known as a Merrill number, is typically employed because it is simpler to calculate the modulo-($2^k-1$) of a value. The more popular residues are 2-bit (modulo-3) and 3-bit (modulo-7) residues, which have lower overhead and are simpler to calculate. A modulo-3 residue can detect not only single-bit errors, but also many 2-bit errors.

To illustrate, calculating the modulo-3 (k=2) residue of a 16-bit value with a hexadecimal representation of 0xb49e begins with grouping bits (bit groups of k=2). The value is represented in base-4 as 23102132. Pairs of the bit groups are added, and the modulo-3 of the sum computed, until the final value is achieved. An equation to represent the generation of the residue may be as follows:

residue=(((2+3)mod3)+((1+0)mod3)+((2+1)mod3)+
 ((3+2)mod3))mod3 =(((2+1)mod3)+
 ((0+2)mod3)mod3)=(0+2)mod3=2.

Figure 1:
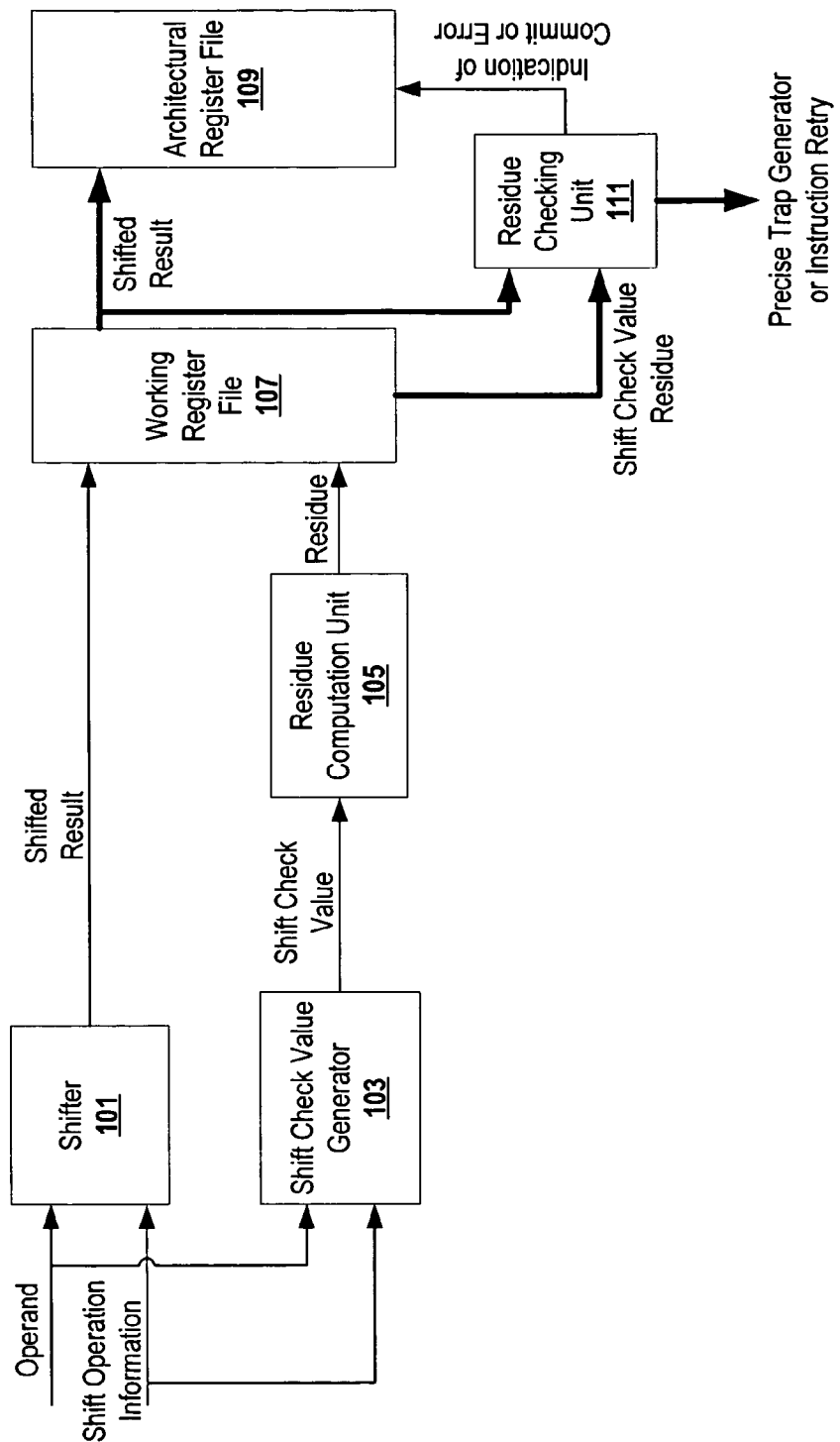
FIG. 1 depicts an example system with a residue-based protection mechanism for a shifter.

FIG. 1 depicts an example system with a residue-based protection mechanism for a shifter. A system includes a shifter 101, a shift check value generator 103, a residue computation unit 105, a residue checker 111, a working register file 107, and an architectural register file 109. Although the examples herein refer to a system with a working register file and an architectural register file, these register files may be physically separate register files or logically separate register files hosted within one or more physical structures. Moreover, a residue-based error detection mechanism for a shifter may also be implemented in an architecture that designates values as being committed with a technique other than copying/moving values from a working register file to an architectural register file (e.g., rename buffers, a single physical register file, etc.).

In FIG. 1, the shifter 101 and the shift check value generator 103 are coupled to receive an operand for a shift operation and information about the shift operation. The shift operation information may be the shift operation, portions of the shift operation, etc. Regardless of the exact means for indicating the shift operation information and form of the shift operation information, at least a shift amount and a shift type are indicated to the shifter 101 and the shift check value generator 103. The shifter 101 shifts the received operand in accordance with the shift operation and is coupled to store the shift result in an appropriate destination entry in the working register file 107. The shift check value generator 103 generates a shift check value in accordance with the shift operation information. The shift check value generator 103 processes the received operand to generate a shift check value with consistency between the k-bit groups of the shift result and of the shift check value. The shift check value generator 103 is coupled to transmit the shift check value to the residue computation unit 105. The residue computation unit 105 computes residues of shift check values received from the shift check value generator 103. The residue computation unit 105 is coupled to store a computed residue of a shift check value into a destination entry of the working register file 107, which corresponds to a destination entry of a corresponding shift operation. A single physical register may be logically organized into a first portion for results of shift operations and a corresponding second portion to host corresponding residue of check values. Another implementation hosts results and residues in separate physical structures that are coupled to maintain correspondence. Those of ordinary skill in the art will appreciate that the correspondence between entries can be maintained with a variety of mechanisms and techniques.

When an attempt is made to commit the shift result, error detection is performed. The shift result is transmitted to the residue checker 111 along with a previously stored residue of a corresponding shift check value. The residue checker 111 includes circuitry similar to the residue computation unit 105 to compute residues. The residue checker 111 computes a residue from the shift result. The residue checker 111 compares the residue of the shift result and the residue of the shift check value. If the residues are the same, then the commit of the shift result is allowed since no error is detected. A shift check value residue may be stored in an architectural register file destination entry that corresponds to the architectural register file destination entry of the shift result making the shift result residue available for other operations and/or execution units. If the residues do not match, then an error has been detected. In the case of an error, the residue checker 111 is coupled to generate one or more signals (e.g., a precise trap) to prevent commit of the shift result, as well as initiation of an error correction mechanism (e.g., retry of the shift operation).

Various mechanisms can be employed for error recovery, such as a trap handling mechanism. For example, assume a current to-be committed instruction instance has an error. The error triggers a precise trap at commit. The precise trap is serviced by a service routine after all instruction instances prior to the current instruction instance have retired. This precise trap's service routine tallies the error for further statistical analysis and initiates a re-execution of the instruction instance. If the original error was due to a soft error in the working register file 107, then the re-execution clears the error because the working register file 107 is re-initialized when the pipeline is cleared as part of handling the trap. If the re-execution also fails, the error may be due to an uncorrectable error (hard error) in the architectural register file 109. In order to overcome this hard error, the software might choose to move the failing core's state to another core.

Although ECC codes may be employed in the architectural register file 109 for correction of errors in the architectural register file 109, residues may be used for error detection in the architectural register file 109 as well as the working register file 107. For single-bit architectural register file errors, including hard errors, designs could be implemented such that there is no failure. However a single-bit architectural register file hard error could result in a significant performance degradation due to repeated traps, which can be addressed with failover to another core.

As already stated, the shift check value generator generates a shift check value with consistency between bit groups of the shift result and the shift check value independent of actual bit positions. For a modulo-7 residue, the addition of 3-bit digits used to compute the residue is commutative. Although correspondence between bit groups does not rely on position, the shift check value generator ensures that the displaced bits are correctly replaced with zero or the sign bit. Due to this independence from bit position, the shift check value generator perceives shift operations as either a shift left by one position, a shift right by one position, or a no shift, although embodiments may reduce a shift operation amount to a value greater than 1. To continue with the modulo-7 example, a shift amount that is a multiple of 3 is translated by the shift check value generator as a shift of 0. Whether a shift operation is translated/reduced to a shift left by one or a shift right by one depends on the shift amount and shift type. Since the residue computation unit utilizes adders that compute mod 7 of a sum of two 3-bit digits, the data vector (i.e., the length of shift check value) is $m=n+3-(n \mod 3)$ bits. For example, a 16-bit number will have an 18-bit vector (m=18), while a 32-bit number will have a 33-bit vector (m=33). The extra bits' value is either zero for a logical shift or the sign bit for an arithmetic shift. These bits are prepended to the left of the values most significant bit (MSB).

Reducing a shift operation to a reduced position shift, such as a single position shift, or no shift, allows consistency of bit groups to be maintained with significantly less circuitry than duplication of an entire shifter. In addition, employing two different mechanisms to generate the residues (i.e., the shifter and the shift check value generator) allows corner case design errors to be detected. The circuitry to generate an operand with bit groupings consistent with the shift result consumes significantly less space and less power than a shifter.

Figure 2:
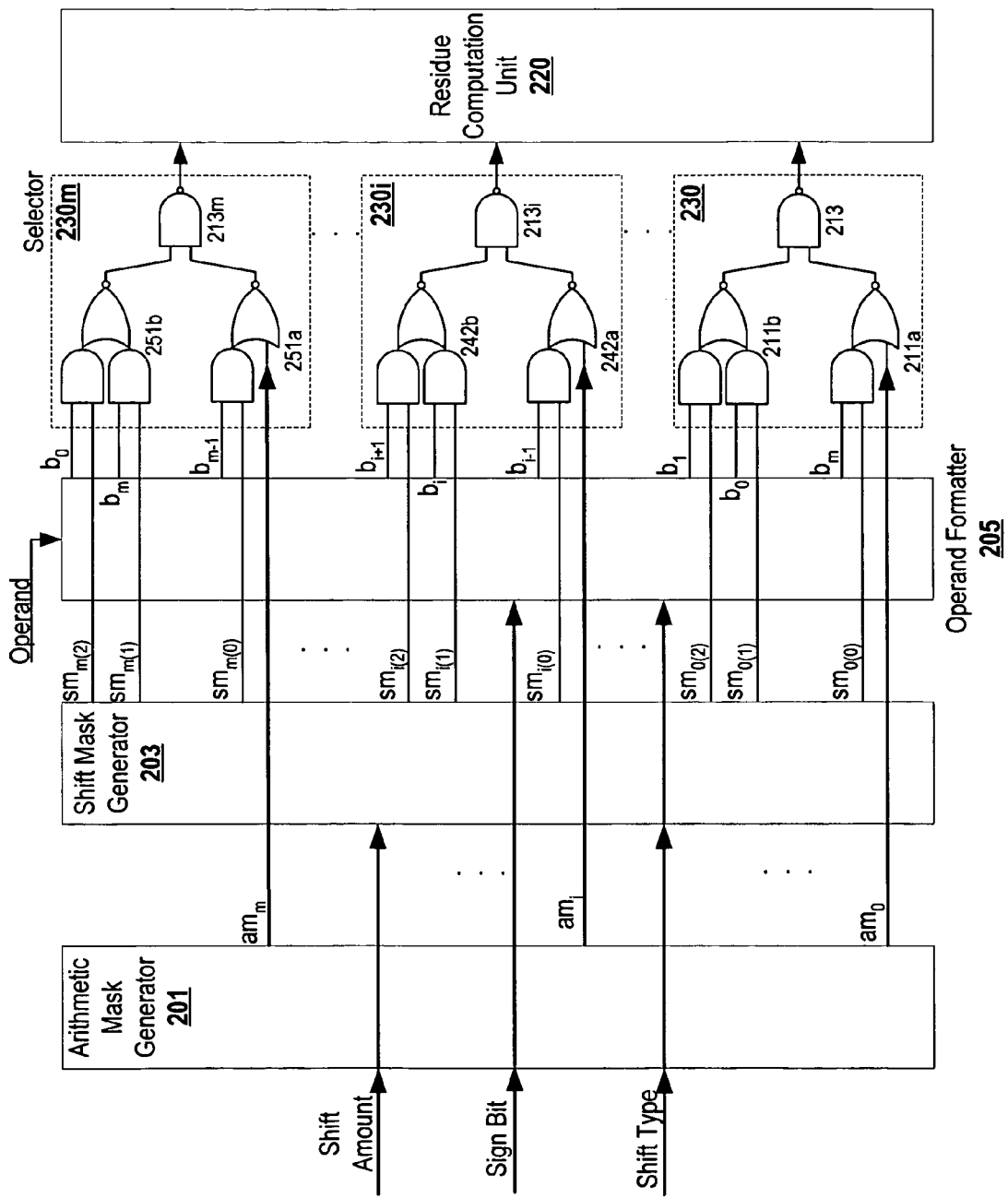
FIG. 2 depicts an example shift check value preparation logic that employs a k*m bit mask.

FIG. 2 depicts an example shift check value preparation logic that employs a k*m bit mask. Although embodiments will vary with the selected divisor, the following description assumes a divisor of 7, thus a k of 3, which is the number of bits of the residue. Further, m is the number of bits used to calculate the shift result's residue. The shift check value generator includes an arithmetic mask generator 201, a shift mask generator 203, and an operand formatter 205. The operand formatter 205 is coupled to a set of selectors 230-230m. The arithmetic mask generator 201 is coupled to receive a shift amount, a shift type, and a sign bit. The shift mask generator 203 is coupled to receive the shift amount and the shift type. Those of ordinary skill in the art will appreciate that the number of selectors will vary, at least, with the divisor.

The operand formatter 205 is coupled to receive an operand, the shift type, and the sign bit. The operand formatter 205 formats a received operand so that the number of bits is a multiple of k. For a logical shift, the operand formatter 205 lengthens the received operand by prepending 0's to the left of the MSB of the received operand. For an arithmetic shift, the operand formatter 205 lengthens a received operand with 1's if the sign bit is a 1 and with 0's if the sign bit is a 0.

The shift mask generator 203 generates a 3*m bit mask. The shift mask includes m 3-bit groups ($sm_{m(2)}$ $sm_{m(1)}$ $sm_{m(0)}$, $sm_{m-1(2)}$ $sm_{m-1(1)}$ $sm_{m-1(0)}$, ..., $sm_{0(2)}$ $sm_{0(1)}$ $sm_{0(0)}$). Each of the 3-bit groups of the shift mask feed into the corresponding one of the selectors 230-230m. The shift mask bit group $sm_0$ corresponds to target position 0 of the formatted operand. The shift mask and the selectors 230-230m effectively implement single position shifting. The shift mask from the shift mask generator 203 and the formatted operand from the operand formatter 205 feed into the selectors 230-230m to shift the formatted operand by +1, 0, or −1, or to force a 0 for any particular bit of the formatted operand that is shifted out. The shift mask generator 203 generates the shift mask in accordance with the shift amount and the shift type. Table 1 indicates the appropriate mask to be generated, with S representing shift amount and k the size of the bit groups with respect to the divisor for the residue computation.

TABLE 1

| | Shift masks | |
|---|---|---|
| | Right Shift | Left Shift |
| Shifted out | 000 | 000 |
| S = k * s | 010 | 010 |
| S = k * s + 1 | 100 | 001 |
| S = k * s − 1 | 001 | 100 |

A shift amount of S, which is a multiple of 3, is not shifted (i.e., shift by 0). In the case of no shift, the shift out bits are either forced to zero or the sign bit, depending upon whether the shift is an arithmetic shift or a logical shift. Assuming a divisor of 7, if S=2 and the shift is to the right, then the formatted operand will be shifted by −1, because 2=3*1−1 (−1 being a single position shift in the opposite direction). If the shift is to the right for the same example, then the formatted operand will be shifted by +1 (+1 being a single position shift in the same direction). Using the same variables with the exception of changing the shift amount to 4, a right shift will cause a +1 shift of the formatted operand, while a left shift causes a −1 shift of the formatted operand.

The arithmetic mask generator 201 generates an m-bit mask ($am_m$ ... $am_0$). The arithmetic mask is used to force the appropriate bits of an intermediate shift check value (i.e., the intermediate shift check value being the result of applying the shift mask to the formatted operand but prior to application of the arithmetic mask, which has no effect for logical shifts) to 1 in case of an arithmetic shift when the sign bit is 1. The arithmetic mask bits' values depend on the sign bit and the shift value. In addition, the arithmetic mask may override forced 0's from the shift mask.

The formatted operand, the shift mask, and the arithmetic mask all feed into the selectors 230-230m. Each bit of the arithmetic mask feeds into a respective one of the selectors 230-230m. Each k-bit group of the shift mask feeds into a respective one of the selectors 230-230m. Each bit of the formatted operand feeds into 3 (based upon a divisor of 7 for residue computation) of the selectors 230-230m. Assuming m selectors and assuming that the formatted operand can be represented as $b_m$, ..., $b_i$, ... $b_0$, $b_i$ feeds into the selector i, selector i−1, and selector i+1. In addition, $b_0$ is feeds into the selector 0, selector m, and the selector 1, while the $b_m$ feeds into the selector m, the selector m−1, and the selector 0.

Each of the selectors 230-230m include 2 AND-OR-Invert gates and a NAND gate. The selector 230 includes AND-OR-Invert gates 211a and 211b and a NAND gate 213. The formatted operand bit $b_0$ and the shift mask $sm_{0(1)}$ feed into the AND-OR-Invert gate 211b. The formatted operand bit $b_1$ and the shift mask $sm_{0(2)}$ also feed into the AND-OR-Invert gate gate 211b. An AND-OR-Invert gate gate 211a receives $b_m$ and $s_{m0(0)}$ as input. The AND-OR-Invert gate 211a also receives the arithmetic mask $am_0$ as input. The NAND gate 213 receives the output of the AND-OR-Invert gate gates 211a and 211b as input. The output of the NAND gate 213a feeds into the residue computation unit 220 as $r_0$ of the shift check value $r_m$ ... $r_0$.

The other selectors, including depicted selectors 230i and 230m, are organized similarly to the selector 230. The selector 230i includes AND-OR-Invert gates 242a and 242b and a NAND gate 213i. The formatted operand bit $b_i$ and the shift mask $sm_{i(1)}$ feed into the AND-OR-Invert gate 242b. The formatted operand bit $b_{i+1}$ and the shift mask $sm_{i(2)}$ also feed into the AND-OR-Invert gate 242b. An AND-OR-Invert gate 242a receives $b_{i-1}$ and $sm_{i(0)}$ as input. The AND-OR-Invert gate 242a also receives the arithmetic mask $am_i$ as input. The NAND gate 213i receives the output of the AND-OR-Invert gates 242a and 242b as input. The output of the NAND gate 213i feeds into the residue computation unit 220 as $r_i$ of the shift check value. The selector 230m includes AND-OR-Invert gates 251a and 251b and a NAND gate 213m. The formatted operand bit $b_m$ and the shift mask $sm_{m(1)}$ feed into the AND-OR-Invert gate 251b. The formatted operand bit $b_0$ and the shift mask $sm_{m(2)}$ also feed into the AND-OR-Invert gate 251b. An AND-OR-Invert gate 251a receives $b_{m-1}$ and $sm_{m(0)}$ as input. The AND-OR-Invert gate 251a also receives the arithmetic mask $am_m$ as input. The NAND gate 213m receives the output of the AND-OR-Invert gate gates 251a and 251b as input. The output of the NAND gate 213m feeds into the residue computation unit 220 as $r_m$ of the shift check value.

Example Operation of the Shift check value Generator Shift Illustrations

The following examples operate with an 8-bit operand with a value of 10011101. As stated above, zeroes are prepended to the operand to increase the length of the operand to a multiple of k (divisor=$2^k$−1), unless of course the length of the operand is already a multiple of k. The increase in length is an effect of applying masks to the operand. For these examples where k=3, the operand is lengthened by a single bit to become 010011101 in the case of logical shifts. For arithmetic shifts, the leftmost bit position is occupied by a sign bit so that the operand is represented as 110011101 in accordance with the sign bit as described above.

Logical Shifts
Logical left 2-bit shift
For a logical shift left by 2, the shift result is 001110100, which has a residue of 4. The shift check value generation logic will generate an AND mask of the following: 100-000-000-100-100-100-100-100-100. As this is a logical shift, the OR mask value is 000000000. These vectors cause the shift check value preparation logic to generate a shift check value of 100001110. Note that the least significant bit (LSB) of the lengthened operand was rotated to the most significant bit (MSB) position of the shift check value. The residue of this shift check value is 4, which is the correct result.

Logical left 4-bit shift
For a logical shift left by 4, the shift result is 011010000, which has a residue of 5. The shift check value generation logic will generate an AND mask of the following: 000-000-000-000-001-001-001-001-001. As this is a logical shift, the OR mask value is 000000000. These vectors cause the shift check value preparation logic to generate a shift check value of 000011010. Note that the MSB of the formatted operand was rotated to the LSB position of the shift check value. The residue of this shift check value is 5, which is the correct result.

Logical right 2-bit shift

For a logical shift right by 2, the shift result is 000100111, which has a residue of 4. The shift check value generation logic will generate an AND mask of the following: 001-001-001-001-001-001-000-000-001. As this is a logical shift, the OR mask value is 000000000. These vectors cause the shift check value preparation logic to generate a shift check value of 100111000, which has a residue of 4.

Logical right 4-bit shift

For a logical shift right by 4, the shift result is 000001001, which has a residue of 2. The shift check value generation logic will generate an AND mask of the following: 000-100-100-100-100-100-000-000-000. As this is a logical shift, the OR mask value is 000000000. These vectors cause the shift check value preparation logic to generate a shift check value of 001001000, which has the correct residue of 2.

Arithmetic Shifts

Arithmetic right 2-bit shift

For an arithmetic shift right by 2, the shift result is 111100111, which has a residue of 4 $(((2^9 \bmod 7)-(111100111 \bmod 7)) \bmod 7=1-4+7=4)$. The shift check value generation logic will generate an AND mask of the following: 001-001-001-001-001-001-000-000-001. As this is an arithmetic shift, the OR mask value is 000000110. These vectors cause the shift check value generation logic to generate a shift check value of 100111111. The residue of the shift check value is also 4 $(((2^9 \bmod 7)-(100111111 \bmod 7)) \bmod 7=1-4+7=4)$. Note that the MSB of the operand was rotated to the LSB position of the shift check value.

Arithmetic right 4-bit shift

For an arithmetic shift right by 4, the shift result is 111111001, which has a residue of 4 $(((2^9 \bmod 7)-(111111001 \bmod 7)) \bmod 7=1-1=0)$. The shift check value generation logic will generate an AND mask of the following: 000-100-100-100-100-100-000-000-000. As this is an arithmetic shift, the OR mask value is 100001111. These vectors cause the shift check value generation logic to generate a shift check value of 111001111. The residue of the shift check value is also 0 $(((2^9 \bmod 7)-(111001111 \bmod 7)) \bmod 7=1-1=0)$. Note that the LSB of the operand was rotated to the MSB position of the shift check value as part of the shift +1, but the rotated LSB is zeroed out because it is shifted out according to the shift mask. However, the arithmetic mask supersedes the shift out and forces the shift out bits to 1's.

It should be understood that depicted logic of the Figures is not meant to be limiting upon the described invention, but meant to aid in understanding the described invention. For example, the selectors may be implemented with any of a variety of techniques and mechanisms for selecting a bit from a group of bits. In addition to different implementation for different divisors, selectors may be implemented different to accommodate different masking techniques. To illustrate, the shift mask in the above example includes k*m bits, with k being 3. However, circuitry that applies a shift mask of m+k bits is employed in another implementation. Such an example mask includes bits that indicate which bits are the shifted out bits plus k-bits that indicate shift (0, +1, −1). Such a shift mask requires significantly less storage since it totals m+k bits instead of m*k bits. However, the reduction in storage is counterbalanced against utilizing more logic gates to implement selectors. For these examples that assume a divisor of 7, the shift mask is reduced from 56 (assuming an 8-bit operand) to 11 bits, and the logic is increased from 7-input AND-OR-Invert logic gates for each position to 10-input AND-OR-Invert logic gates for each bit position. As stated above, implementations also differ from utilization of different divisors.

Figure 3:
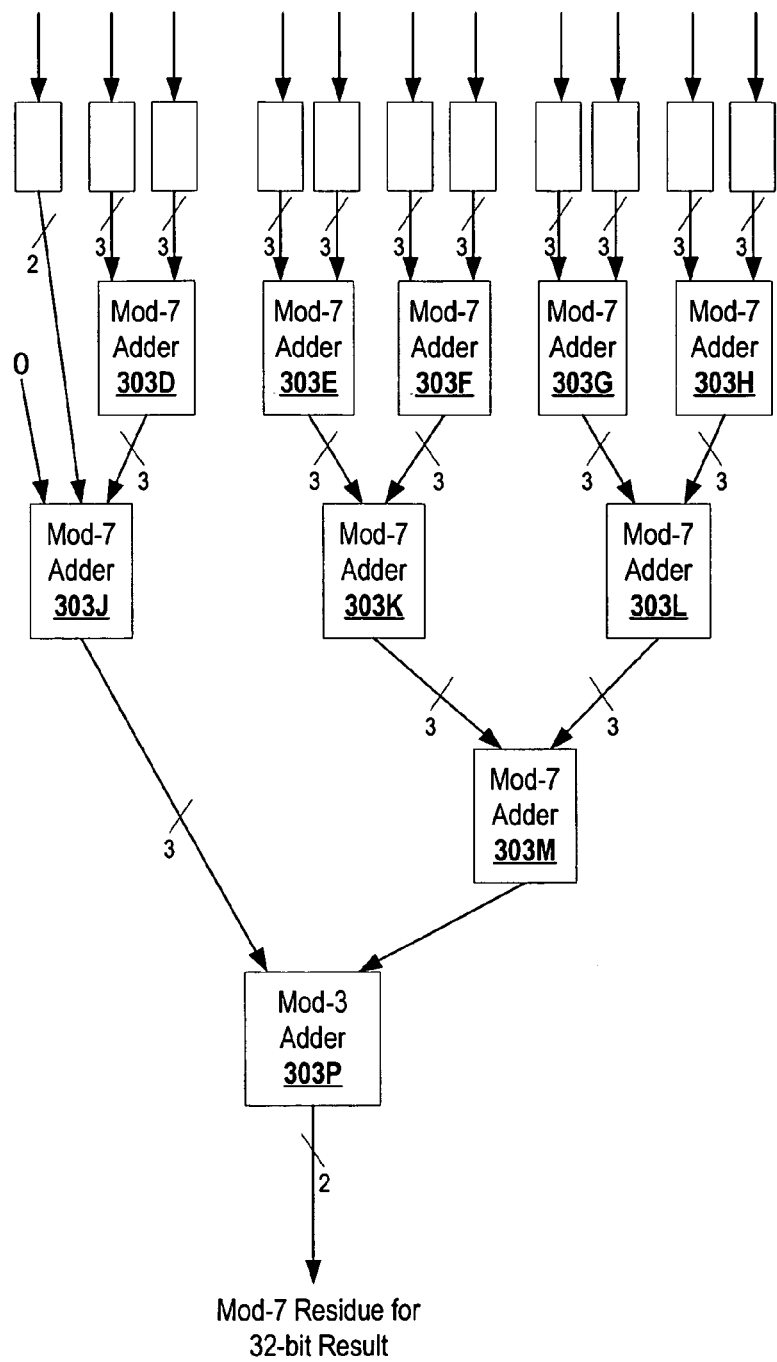
FIG. 3 depicts an example of logic to compute modulo-7 residues.

FIG. 3 depicts an example of logic to compute modulo-7 residues. In FIG. 3, a series of storage cells hold a 32-bit value. The storage cells are coupled to receive input from a shift check value generator, such as the shift check value generator 103 of FIG. 1. The first 10 storage cells are coupled to supply two 3-bit values to each of modulo-7 adder units 303D-303H. Each of the modulo-7 adder units 303D-303H adds the supplied three bit pairs and computes modulo-7 of the sum. The 3-bit representation of the result is then forwarded to another modulo-7 adder unit. In FIG. 3, the units 303E and 303F supply their output to the modulo-7 adder unit 303K. The units 303G and 303H supply their output to the modulo-7 adder unit 303L. Since the bit groups were 3 and the input value was initially a 32-bit value, the logic is implemented (in this example that assumes a divisor of 7 and a 32-bit operand) to handle a 33-bit input. Hence, in the first stage of computations, the 2 most significant bits are supplied to the logic of FIG. 3 as a 3 bit group with a zero bit completing the group. In addition, the 3-bit group for the most significant bits has no complementary bit group, and is therefore advanced to the second stage of computations. A mod-7 adder 303J receives as input the output of the mod-7 adder 303D and the 3 MSBs. The output of the mod-7 adders 303K and 303L are supplied to the mod-7 adder 303M. The output of the mod-7 adder 303J does not have a complementary bit group and is forwarded to the mod-7 adder 303P. The mod-7 adder 303P computes the mod-7 residue of the output of the mod-7 adders 303M and 303J.

The described invention may be provided as a computer program product, or software, encoded in one or more machine-readable medium, such as a machine-readable medium having stored thereon instructions, which may be used to program a computer system (or other electronic devices) to perform some or all of the functionality described above. A machine readable medium includes any mechanism for storing or transmitting information in a form (e.g., firmware, software, application, etc.) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 4:
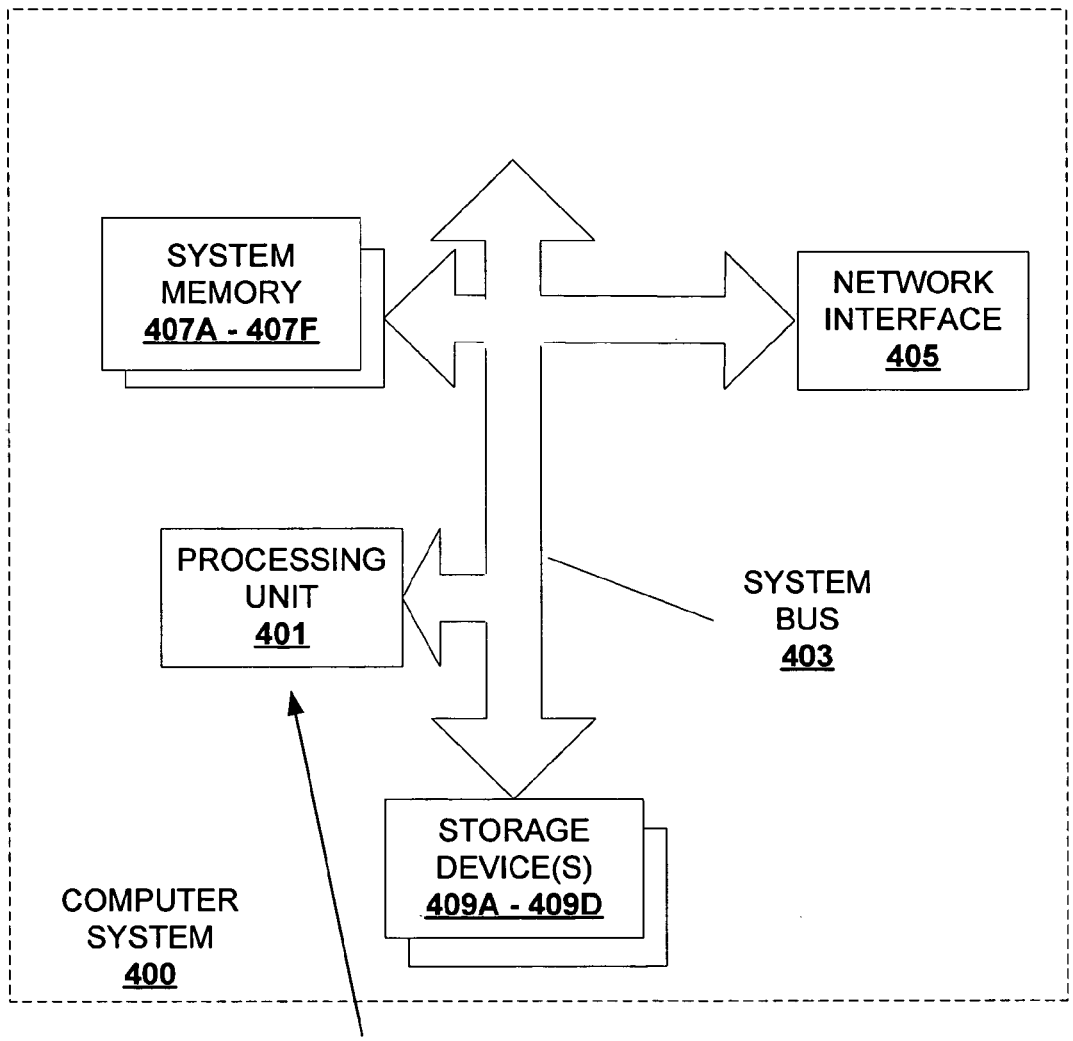
FIG. 4 depicts an exemplary computer system.

FIG. 4 depicts an exemplary computer system according to realizations of the invention. A computer system 400 includes a processing unit 401 (possibly realized as a single core processor, multiple core processor, multiple processors, etc.). The computer system 400 also includes a main memory 407A-407F (e.g., one or more of cache, SDRAM, RDRAM, EDO RAM, DDR RAM, EEPROM, etc.), a system bus 403 (e.g., LDT, PCI, ISA, etc.), a network interface 405 (e.g., an ATM interface, an Ethernet interface, a Frame Relay interface, etc.), and a storage device(s) 409A-409D (e.g., optical storage, magnetic storage, etc.). Realizations of the invention may include fewer or additional components not illustrated in FIG. 4 (e.g., video cards, audio cards, additional network interfaces, peripheral devices, etc.). The processing unit 401, the storage device(s) 409A-409D, the network interface 405, and the main memory 407A-407F are coupled to the system bus 403. The processing unit 401 includes a residue-based error detection mechanism for one or more shifters. In some realizations of the invention, some functionality of the residue-based error detection may be embodied in the main memory 407A-407F (e.g., computation of the residue may be implemented with code), may be performed by a co-processor, etc.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A computer program product encoded on machine-readable medium for detecting errors in shifting, wherein said computer program product causes a computer to perform operations comprising:
    generating a shift check value with bit groupings consistent with a shifted value, wherein the shift check value and the shifted value are generated from an operand of a shift operation and the bit groupings are with respect to a divisor;
    computing a residue of the shift check value with the divisor; and
    detecting an error in the shifted value with the residue of the shift check value.

2. The computer program product of claim 1, wherein the detecting errors comprises:
    computing a residue of the shifted value with the divisor; and
    comparing the shifted value residue and the check value residue.

3. The computer program product of claim 1,
    wherein the divisor is a Merrill number that can be expressed as $2^k-1$,
    wherein each of the bit groups includes k bits.

4. The computer program product of claim 3, wherein the generating the shift check value comprises reducing a shift operation into either a single bit position shift or a zero bit position shift, wherein the shifted value is generated from execution of the shift operation when k is equal to 2 or 3.

5. The computer program product of claim 4, wherein the reducing the shift operation comprises:
    selecting those bits of the first value that will not be shifted out when the first value is shifted; and
    shifting the selected bits based, at least in part, on a difference between a shift amount of the shift operation and a multiple of the k.

6. The computer program product of claim 4, wherein a shift mask is employed to cause the reduction of the shift operation.

7. The computer program product of claim 6, wherein an arithmetic mask is employed to preserve a sign bit if the shift operation is an arithmetic shift.

8. The computer program product of claim 6,
    wherein the shift mask is implemented as a vector of m*k bits, or a vector of m+k bits,
    wherein m=n+k−(n mod k),
    wherein n is a number of bits in first value.

9. A processor comprising:
    plurality of store locations;
    a shifter operable to perform a shift operation on a value and to store a result of a shift operation into the plurality of store locations;
    a shift check value generator operable to generate a shift check value with bit groups consistent with a corresponding shifted value;
    a residue computation unit coupled to receive a shift check value from the shift check value generator, the residue computation unit operable to compute a residue for a shift check value and operable to store a residue of a shift cheek value into the plurality of store locations; and
    a residue checker coupled to the plurality of store locations, the residue checker having a residue computation unit to compute a residue for a shifted value and the residue checker operable to compare a residue of a shifted value stored at a first of the plurality of store locations with a residue of a shift check value at a corresponding one of the plurality of store locations,
    wherein the residue computation units compute a reside in accordance with a divisor.

10. The processor of claim 9, wherein the processor detects errors in shifted values with the residue checker and without a duplicate shifter.

11. The processor of claim 9, wherein the residue checker is further operand to generate an indication of an error responsive to detection of an error.

12. The processor of claim 11, wherein the error indication includes at least one of a precise trap and a retry signal.

13. The processor claim of 9, wherein the shift check value generator comprises:
    an operand formatter coupled to receive an operand and indication of shift type and sign, the operand formatter operable to format a received operand, in accordance with the indicated shift type and sign, to accommodate bit groupings that are based on a divisor value, which is the basis for the residue computation;
    a shift mask generator coupled to receive indication of a shift type and shift amount, the shift mask generator operable to generate a shift mask that translates a shift operation into a single bit position shift or zero shift;
    an arithmetic mask generator coupled to receive indication of shift amount, shift type, and sign, the arithmetic mask generator operable to generate an arithmetic mask that introduces bits shifted in from an arithmetic shift operation; and
    a plurality of selectors coupled to receive a shift mask, an arithmetic mask, and a formatted operand and coupled to output to the residue computation unit, the plurality of selectors operable to select bits from the formatted operand and route selected bits to the residue computation unit in accordance with the shift mask and the arithmetic mask.

14. The processor of claim 13, wherein each of the plurality of selectors comprises a first set of logic gates operable to apply a shift mask to a formatted operand and a second set of logic gates operable to apply an arithmetic mask to output of the first set of logic gates.

15. The processor of claim 13, wherein each of the plurality of selectors is implemented as 7-input AND-OR-Invert gates and the shift mask is a k*m bit mask, wherein the divisor=$2^k-1$ and m=n+k−(n mod k), wherein k is equal to 3 and n is equal to a number of bits comprising an operand.

16. The processor of claim 13, wherein each of the plurality of selectors is implemented as 10-input AND-OR-Invert gates and the shift mask is an m+k bit mask, wherein the divisor=$2^k-1$ and m=n+k−(n mod k), wherein k is equal to 3 and n is equal to a number of bits comprising an operand.

17. An apparatus comprising:
a shifter operable to perform shift operations; and
means for residue-based shifter error detection that reduces a shift operation, which defines a divisor as $2^k-1$ for residue computation, to maintain consistency of bit groupings between a shift result and a shift check value.

18. The apparatus of claim 17 further comprising means for maintaining bit groupings consistency between a shift result and a shift check value.

19. The apparatus of claim 17 further comprising means for generating a shift mask that implements the reduction of a shift operation into a single bit position shift or a zero position shift when the divisor is 7 or 3.

* * * * *

UNITED STATES PATENT AND TRADEMARK OFFICE
CERTIFICATE OF CORRECTION

PATENT NO. : 7,543,007 B2 Page 1 of 1
APPLICATION NO. : 11/209124
DATED : June 2, 2009
INVENTOR(S) : Sorin Iacobovici It is certified that error appears in the above-identified patent and that said Letters Patent is hereby corrected as shown below:

In Claim 9, Column 10 (line 28), please replace "cheek" with --check--.

Signed and Sealed this

Twenty-eighth Day of July, 2009

JOHN DOLL
*Acting Director of the United States Patent and Trademark Office*